United States Patent
Nefcy et al.

(10) Patent No.: US 11,254,297 B2
(45) Date of Patent: Feb. 22, 2022

(54) SYSTEMS AND METHODS FOR OPERATING A TORQUE CONVERTER CLUTCH

(71) Applicant: Ford Global Technologies, LLC, Dearborn, MI (US)

(72) Inventors: Bernard D. Nefcy, Novi, MI (US); Zhengyu Dai, Canton, MI (US); Daniel Colvin, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 882 days.

(21) Appl. No.: 14/225,328

(22) Filed: Mar. 25, 2014

(65) Prior Publication Data

US 2015/0274147 A1 Oct. 1, 2015

(51) Int. Cl.
| | |
|---|---|
| *B60W 10/02* | (2006.01) |
| *B60W 10/06* | (2006.01) |
| *B60W 10/08* | (2006.01) |
| *B60W 20/40* | (2016.01) |
| *B60K 6/387* | (2007.10) |
| *B60K 6/547* | (2007.10) |
| *B60W 30/192* | (2012.01) |

(Continued)

(52) U.S. Cl.
CPC ........... *B60W 10/026* (2013.01); *B60K 6/387* (2013.01); *B60K 6/547* (2013.01); *B60W 10/02* (2013.01); *B60W 10/06* (2013.01); *B60W 10/08* (2013.01); *B60W 20/40* (2013.01); *B60K 2006/4825* (2013.01); *B60W 30/192* (2013.01); *B60W 2030/203* (2013.01); *B60W 2510/0208* (2013.01); *B60W 2510/06* (2013.01); *B60W 2510/08* (2013.01); *B60W 2710/024* (2013.01); *B60W 2710/027* (2013.01); *Y02T 10/62* (2013.01); *Y10S 903/902* (2013.01); *Y10T 477/26* (2015.01)

(58) Field of Classification Search
CPC .... B60W 10/02; B60W 10/026; B60W 10/06; B60W 10/08; B60W 2710/024; B60K 6/387; B60K 6/547
See application file for complete search history.

(56) References Cited

U.S. PATENT DOCUMENTS

| | | | |
|---|---|---|---|
| 8,123,656 | B2 | 2/2012 | Schoenek et al. |
| 8,292,012 | B2 | 10/2012 | Sowul et al. |
| 2009/0124453 | A1 | 5/2009 | Seel et al. |

(Continued)

FOREIGN PATENT DOCUMENTS

| | | |
|---|---|---|
| CN | 102765379 A | 11/2012 |
| CN | 103381811 A | 11/2013 |

(Continued)

OTHER PUBLICATIONS

Anonymous, "Dual Clutch Powershift Life Analysis Process," IPCOM No. 000143581, Published Nov. 29, 2006, 3 pages.

(Continued)

*Primary Examiner* — Tinh Dang
(74) *Attorney, Agent, or Firm* — David Kelley; McCoy Russell LLP (57) ABSTRACT

Systems and methods for improving operation of a hybrid vehicle driveline are presented. In one example, a margin torque for closing a torque converter clutch is adjusted responsive to a state of engine operation.

10 Claims, 6 Drawing Sheets

(51) Int. Cl.
*B60W 30/20* (2006.01)
*B60K 6/48* (2007.10)

(56) References Cited

U.S. PATENT DOCUMENTS

| | | | | |
|---|---|---|---|---|
| 2010/0174460 | A1* | 7/2010 | Gibson | B60W 10/026 |
| | | | | 701/54 |
| 2010/0250037 | A1* | 9/2010 | Yoshida | B60K 6/365 |
| | | | | 701/22 |
| 2012/0323425 | A1* | 12/2012 | Suyama | B60K 6/387 |
| | | | | 701/22 |
| 2013/0264164 | A1 | 10/2013 | Otanez et al. | |
| 2015/0072829 | A1* | 3/2015 | Michikoshi | B60K 6/48 |
| | | | | 477/5 |

FOREIGN PATENT DOCUMENTS

| | | | | |
|---|---|---|---|---|
| DE | 10338623 A1 | 3/2005 | | |
| JP | WO2013/121567 | * | 8/2013 | B60W 10/02 |

OTHER PUBLICATIONS

State Intellectual Property Office of the People's Republic of China, Office Action and Search Report Issued in Application No. 201510131714.0, dated Mar. 27, 2018, 9 pages. (Submitted with Partial Translation).

* cited by examiner

SYSTEMS AND METHODS FOR OPERATING A TORQUE CONVERTER CLUTCH

FIELD

The present description relates to systems and methods for improving vehicle driveline operation. The system and methods may be particularly useful for a vehicle that includes an engine that may be selectively coupled to a driveline.

BACKGROUND AND SUMMARY

A hybrid vehicle driveline may include an engine and an electric machine that supply torque to the vehicle's wheels via a transmission. The transmission may be an automatic transmission that includes a torque converter. The torque converter multiplies engine torque and provides a fluidic coupling between propulsion devices and the wheels. However, the torque converter may increase driveline losses when torque converter input speed is different from torque converter output speed. Therefore, it may be desirable to close a torque converter clutch that mechanically couples the torque converter's impeller to the torque converter's turbine. By mechanically coupling the turbine to the impeller, torque converter losses may be reduced.

The torque converter clutch may be opened and closed by releasing and supplying transmission fluid to the torque converter clutch. Transmission fluid may be supplied to the torque converter clutch at different pressures to adjust the torque converter clutch torque capacity. The torque converter clutch capacity (e.g., the amount of torque the torque converter clutch is able to transfer) may be increased up to a rated torque capacity of the torque converter clutch, which may be referred to as a hard locking of the torque converter clutch. It may be desirable to slip the torque converter clutch to reduce driveline vibration when the engine is started by the electric machine; however, engine starting may have to be delayed because it takes a finite amount of time to reduce torque converter clutch pressure so that the torque converter clutch may be allowed to slip.

The inventors herein have recognized the above-mentioned disadvantages and have developed a driveline operating method, comprising: applying a first margin torque to a torque converter clutch when an engine and an electric machine are mechanically coupled; and applying a second margin torque to the torque converter clutch when the engine and electric machine are not mechanically coupled.

By applying different margin torques for different driveline operating conditions, it may be possible to provide the technical result of reducing engine starting delay during an engine restart. Specifically, if an engine is stopped and torque is provided to a driveline only via an electric machine, the torque converter clutch torque capacity may be reduced to a lesser torque than if the engine and motor were providing torque to a transmission. Reducing the torque converter clutch capacity may allow the torque converter clutch to operate at a lower pressure so that it take less time to drain transmission fluid from the torque converter clutch so that the torque converter clutch may slip and reduce driveline noise and vibration.

The present description may provide several advantages. Specifically, the approach may allow for shorter engine reactivation times. Further, the approach may reduce driveline losses. Further still, the approach may improve vehicle fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
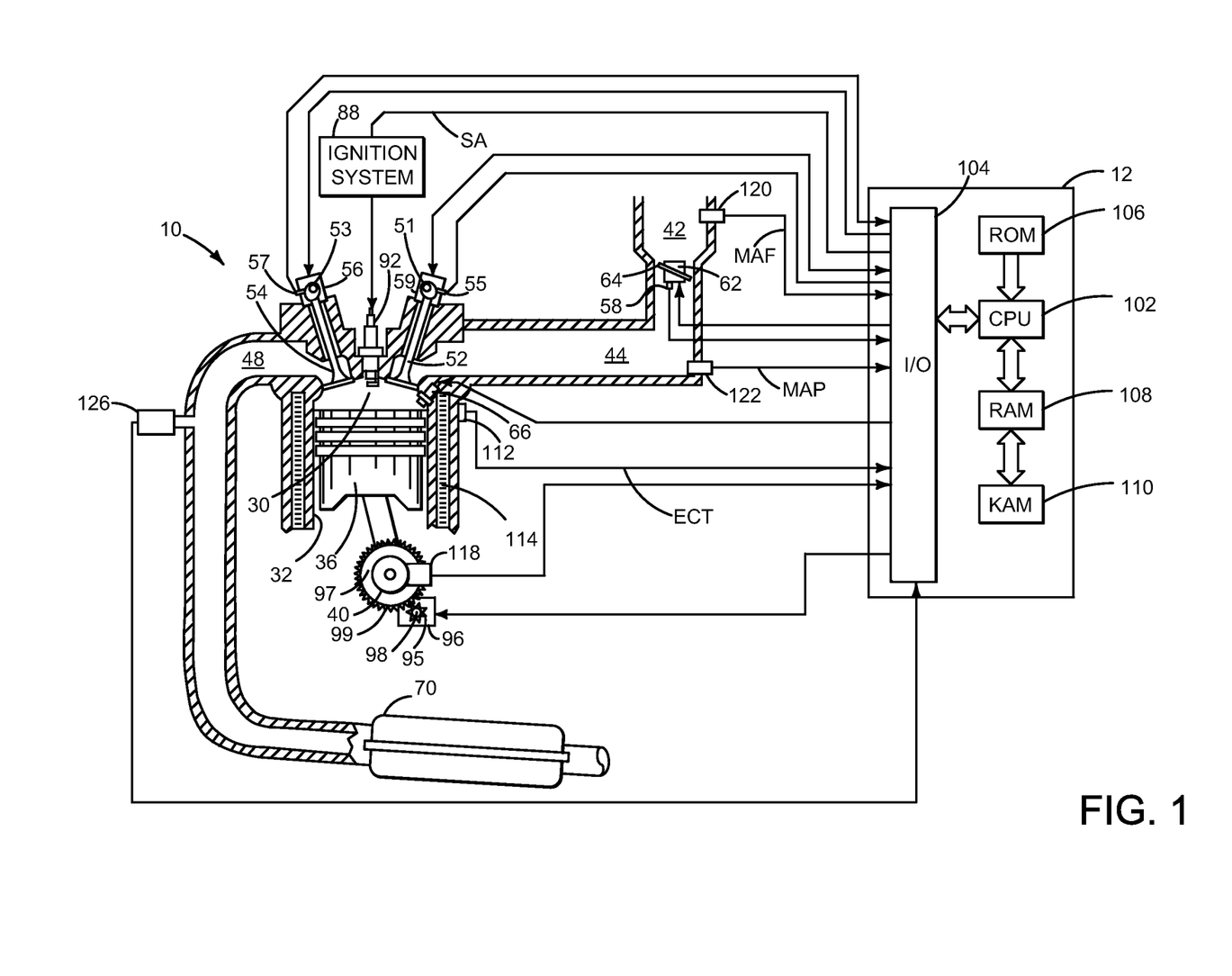
FIG. 1 is a schematic diagram of an engine.
Figure 2:
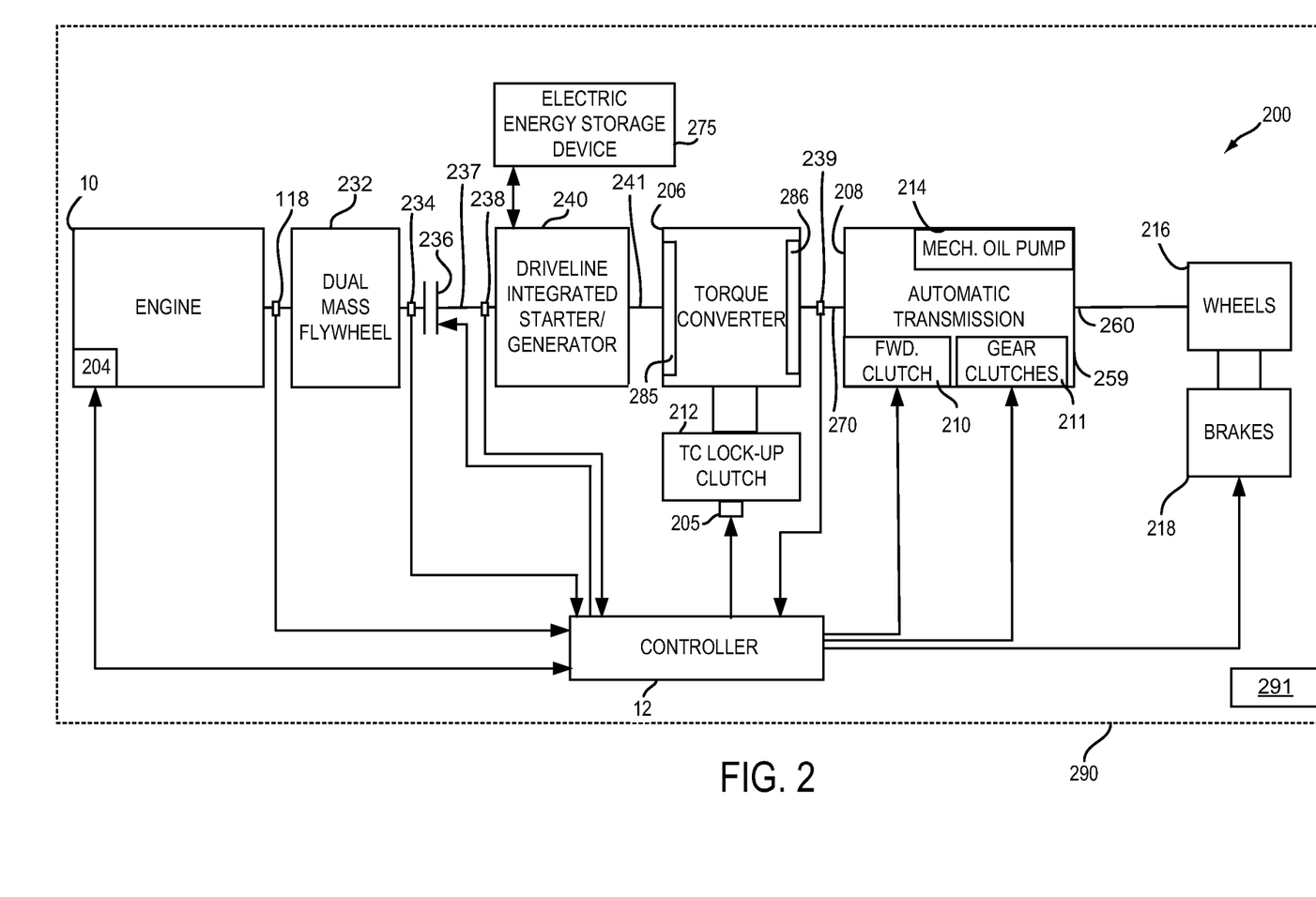
FIG. 2 shows an example vehicle driveline configuration.

The present description is related to operating a torque converter clutch of a hybrid vehicle. The vehicle may include an engine as is shown in FIG. 1. The engine may be mechanically coupled to other vehicle components including a motor to form a driveline as is shown in FIG. 2. The engine and the motor may be selectively coupled and decoupled to change driveline operating modes. Margin torque may be supplied to the torque converter clutch as shown in the sequences of FIGS. 3-6 according to the method of FIG. 7.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Timing of exhaust cam 53 may be varied with respect to timing of crankshaft 40 using exhaust cam phase adjuster 56 so as to adjust exhaust valve opening and closing positions relative to crankshaft position. Timing of intake cam 51 may be varied with respect to timing of crankshaft 40 using exhaust cam phase adjuster 59 so as to adjust exhaust valve opening and closing positions relative to crankshaft position.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width of a signal from controller 12. Fuel is delivered to fuel injector 66 by a fuel system (not shown) including a fuel tank, fuel pump, and fuel rail. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10 in vehicle 290. The vehicle 290 may include a passenger cabin 291 for transporting passengers.

Engine 10 may be started with an engine starting system shown in FIG. 1 or via driveline integrated starter/generator (DISG) or electric machine (e.g. motor) 240. Further, engine 10 may generate or adjust torque via torque actuator 204, such as a fuel injector, throttle, cam, ignition coil, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of driveline disconnect clutch 236. Driveline disconnect clutch 236 may be electrically or hydraulically actuated and it may be positioned outside of transmission case 259. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is hydraulically operated by controller 12 adjusting hydraulic valve 205 which is supplied by pump 214. In one example, the torque converter may be referred to as a component of the transmission; however, in other examples the torque converter may be considered apart from the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to automatic transmission 208 to be adjusted via slippage. Controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, driveline disconnect clutch 240, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases. In some examples, pump 214 has insufficient capacity to simultaneously supply the disconnect clutch during its pressure boost phase and the at least one shifting clutch during its pressure boost phase without increasing transmission shift time.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 via a starter or the DISG and resuming cylinder combustion.

Thus, the system of FIGS. 1 and 2 provides for a vehicle driveline, comprising: an engine; a driveline integrated starter/generator (DISG) selectively coupled to the engine; a torque converter including a torque converter clutch coupled to the DISG; and a controller including non-transitory instructions for increasing a torque capacity of the torque converter clutch to a torque greater than a transmission input shaft torque, the torque capacity increased to a torque based on a margin torque that is responsive to a number of active torque sources in the vehicle driveline. The vehicle driveline includes where the number of active torque sources is based on active torque sources in the vehicle driveline that provide positive torque to the driveline.

In some examples, the vehicle driveline further comprises additional instructions for reducing the torque capacity in response to a request to start an engine. The vehicle driveline includes where the torque capacity is reduced via a plurality of ramp rates. The vehicle driveline further comprises decreasing the torque capacity of the torque converter clutch in response to a reduction in the number of active torque sources. The vehicle driveline includes where the DISG is selectively coupled to the engine via a driveline disconnect clutch.

Figure 3:
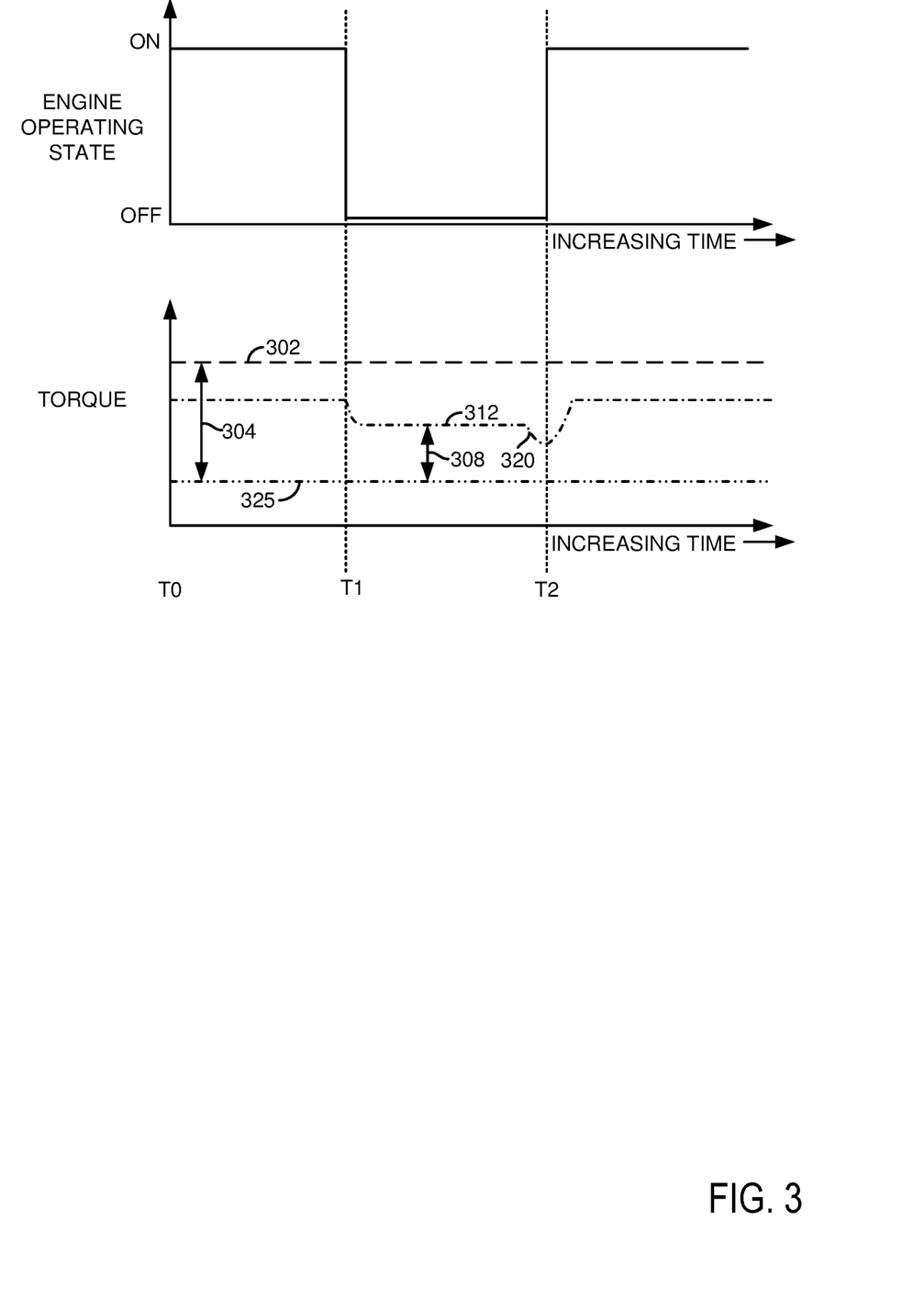
FIGS. 3-6 show example torque converter operating sequences.

Referring now to FIG. 3, an example simulated torque converter clutch operating sequence is shown. The sequence of FIG. 7 may be provided by the system of FIGS. 1 and 2 according to the method of FIG. 7. Vertical markers T0-T2 show timings of particular events during the operating sequence. FIG. 3 shows adjusting torque converter clutch torque capacity according to the method of FIG. 7 from a closed torque converter clutch condition.

The first plot from the top of FIG. 3 is a plot of engine state versus time. The engine operating state may be off (e.g., stopped) or on (e.g., running) The Y axis represents engine operating state and the engine is on when the trace is at a higher level. The engine is off when the trace is at a lower level. The X axis represents time and time increases from the left side of FIG. 3 to the right side of FIG. 3.

The second plot of FIG. 3 is a plot of torque versus time. The Y axis represents torque and torque increases in the direction of the Y axis arrow. The X axis represents time and time increases from the left side of FIG. 3 to the right side of FIG. 3. Horizontal line 302 represents a rated torque converter clutch capacity or the torque converter hard lock torque. Dash dot line 312 represents a torque converter clutch torque capacity for operating the torque converter clutch according to the method of FIG. 7 (e.g., torque capacity for operating the torque converter clutch with only the electric machine at a time when the engine is stopped). Dashed double dot line 325 represents transmission input shaft torque.

Margin torque may be described as a torque capacity increase of a torque converter clutch that is greater than torque applied to an input shaft of a transmission. For example, if transmission input shaft torque is 100 N-m and the torque converter clutch capacity is adjusted to 150 N-m, the margin torque is 50 N-m.

Arrow 304 shows a hard lock margin torque, which is the transmission input shaft torque and plus the torque represented by the length of arrow 304. Arrow 308 shows an electric machine margin torque for a time when only the electric machine is providing positive torque to the driveline, which is the transmission input shaft torque and plus the torque represented by the length of arrow 308.

At time T0, the transmission input shaft torque 325 and the torque converter hard lock torque 302 are at constant values.

At time T1, the engine operating state trace changes state to indicate that the engine is stopped. The engine may stop based on driving conditions and/or vehicle operating conditions. The torque converter clutch torque capacity according to the method of FIG. 7 (e.g., 312) is reduced in response to the engine being stopped. The torque converter clutch torque capacity may be reduced since the electric machine is capable of supplying less torque to the driveline. By reducing the torque converter clutch torque capacity, it may take less time for fluid to flow from the torque converter clutch so that the torque converter clutch may slip earlier in time so as to reduce an amount of time for starting the engine. The transmission input shaft torque 325 and the torque converter hard lock torque 302 remain at constant values.

At a time between time T1 and T2, closer to time T2, a request to restart the engine is made (not shown). Trace 310 shows that the torque converter clutch torque capacity is reduced. Consequently, the engine may be started earlier in time or the reduction in torque converter torque capacity may be delayed as is shown in FIG. 3. The torque converter clutch torque capacity is reduced to allow the torque converter to slip during engine starting, thereby reducing noise, vibration, and harshness during engine starting. The torque converter clutch capacity at 320 is ramped as shown in more detail in FIG. 5.

Figure 7:
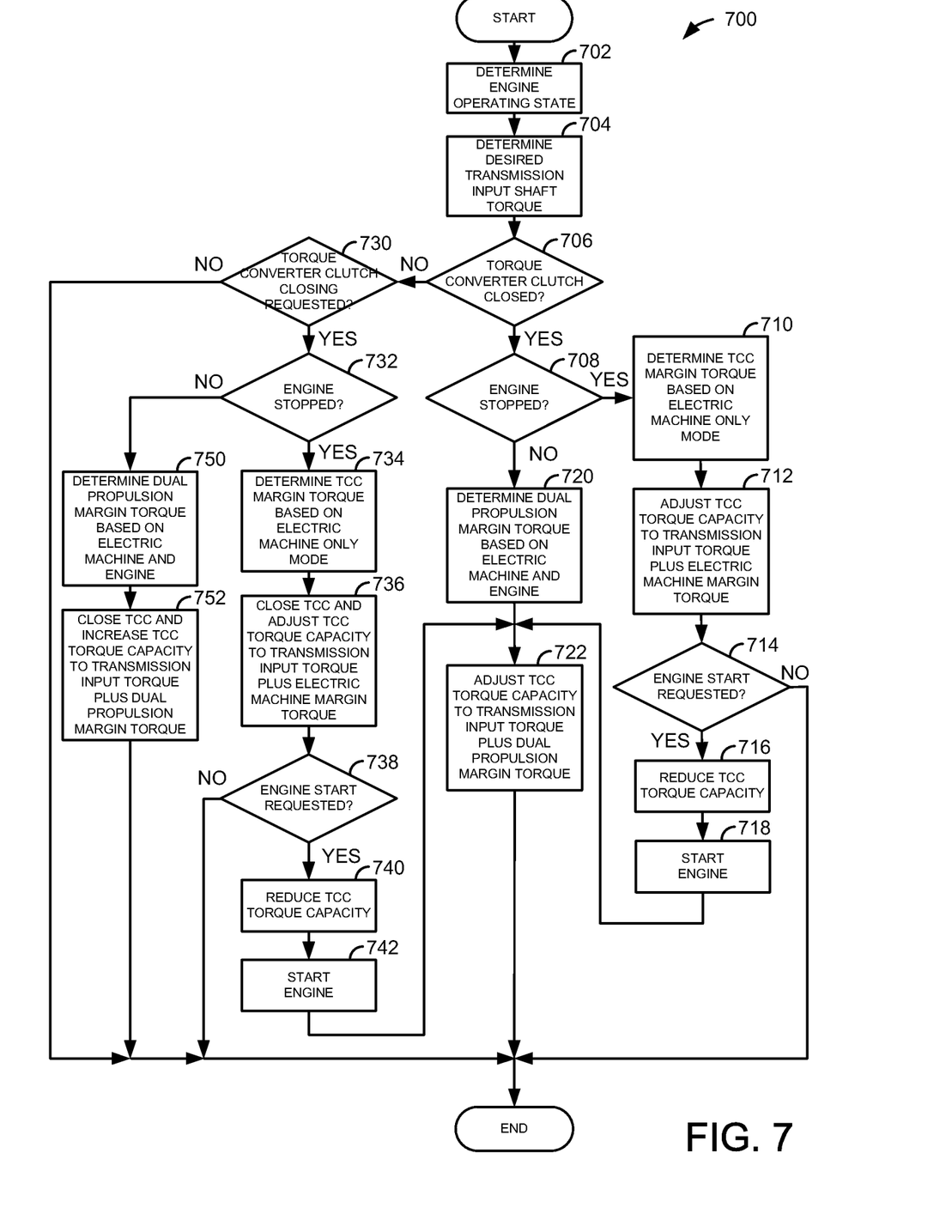
FIG. 7 shows a flowchart of an example method for operating a torque converter clutch.

At time T2, the engine is restarted as indicated by the engine operating state transitioning to a higher level. Since the engine is restarted, the torque converter clutch torque capacity according to the method of FIG. 7 is increased. The transmission input shaft torque 325 and the torque converter hard lock torque 302 remain at constant values.

In this way, torque converter clutch torque capacity may be adjusted in response to active torque sources supplying positive torque to a vehicle driveline. If a number of active torque sources (e.g., engine and/or motor) increases the cumulative torque that may be provided to the driveline from the active torque sources, the torque converter clutch torque capacity may be increased. On the other hand, if the cumulative torque that may be provided to the driveline from the active torque sources is decreased in response to a decrease in the number of active torque sources, the torque converter clutch torque capacity may be decreased.

Figure 4:
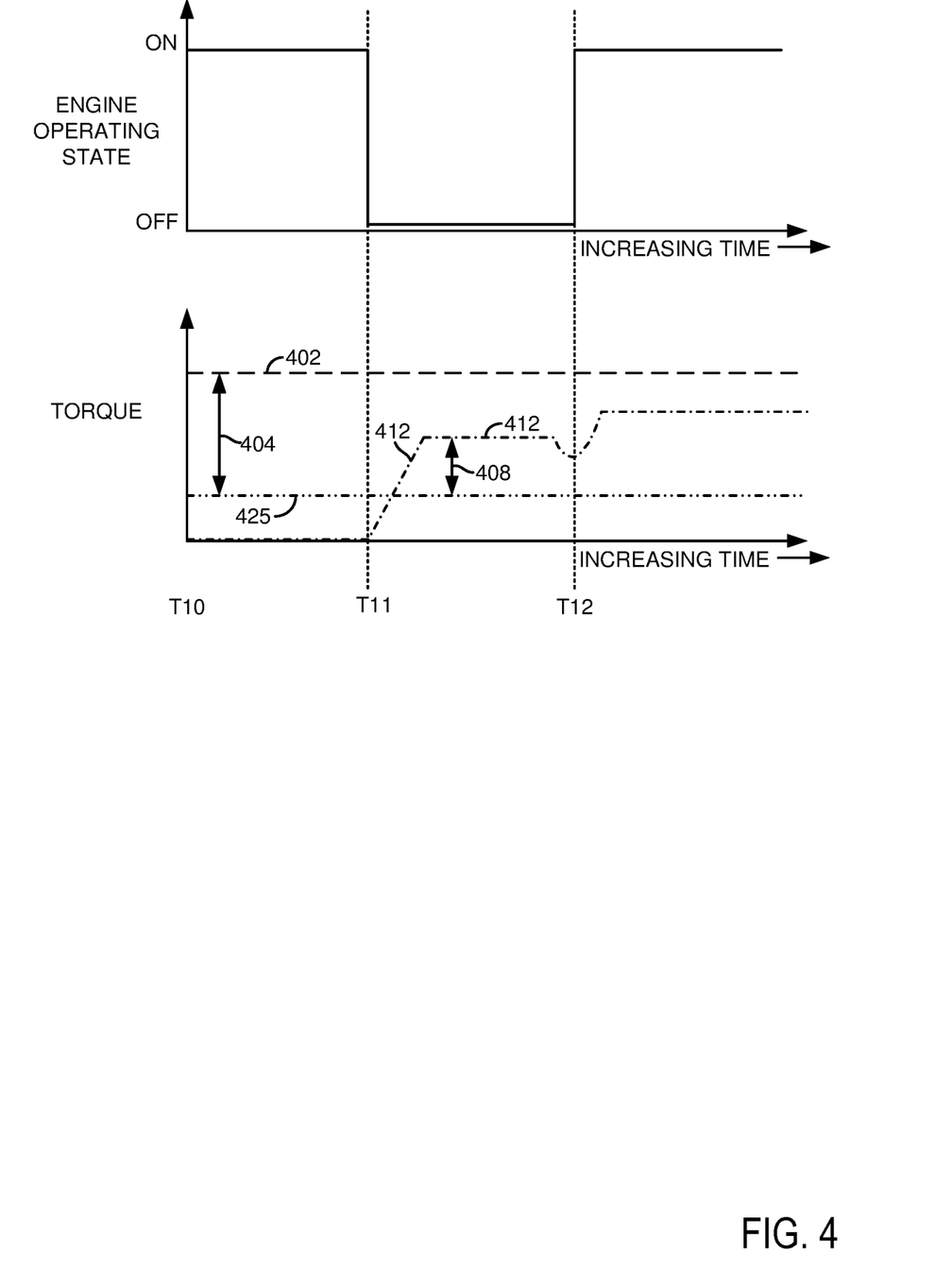

Referring now to FIG. 4, an example simulated torque converter clutch operating sequence is shown. The sequence of FIG. 7 may be provided by the system of FIGS. 1 and 2 according to the method of FIG. 7. Vertical markers T10-T12 show timings of particular events during the operating sequence. FIG. 4 shows adjusting torque converter clutch torque capacity according to the method of FIG. 7 from an open torque converter clutch condition.

The first plot from the top of FIG. 4 is a plot of engine state versus time. The engine operating state may be off (e.g., stopped) or on (e.g., running) The Y axis represents engine operating state and the engine is on when the trace is at a higher level. The engine is off when the trace is at a lower level. The X axis represents time and time increases from the left side of FIG. 4 to the right side of FIG. 4.

The second plot of FIG. 4 is a plot of torque versus time. The Y axis represents torque and torque increases in the direction of the Y axis arrow. The X axis represents time and time increases from the left side of FIG. 4 to the right side of FIG. 4. Horizontal line 402 represents a rated torque converter clutch capacity or the torque converter hard lock torque. Dash dot line 412 represents a torque converter clutch torque capacity for operating the torque converter clutch according to the method of FIG. 7 (e.g., torque capacity for operating the torque converter clutch with only the electric machine at a time when the engine is stopped). Dashed double dot line 425 represents transmission input shaft torque.

Arrow 404 shows a hard lock margin torque, which is the transmission input shaft torque and plus the torque represented by the length of arrow 404. Arrow 408 shows an electric machine margin torque for a time when only the electric machine is providing positive torque to the driveline, which is the transmission input shaft torque and plus the torque represented by the length of arrow 408.

At time T10, the engine is on and the torque converter clutch torque capacity according to the method of FIG. 7 (e.g., 412) is zero. The transmission input shaft torque 425 and the torque converter hard lock torque 402 are at constant values.

At time T11, the engine operating state trace changes state to indicate that the engine is stopped. The engine may stop based on driving conditions and/or vehicle operating conditions. The torque converter clutch torque capacity according to the method of FIG. 7 (e.g., 412) begins to increase in response to the engine being stopped in preparation for an engine restart. By increasing the torque converter clutch torque capacity, it may be possible to increase driveline efficiency. The transmission input shaft torque 425 and the torque converter hard lock torque 402 remain at constant values.

At a time between time T11 and T12, torque converter clutch torque capacity according to the method of FIG. 7 (e.g., 412) is ramped to a level that is based on supplying torque to the driveline via only the electric machine or motor. Trace 412 continues at this respective level until shortly before time T12.

Shortly before time T12, a request to restart the engine is made (not shown). Trace 412 shows that the torque converter clutch torque capacity is reduced. Consequently, the engine may be started earlier in time or the reduction in torque converter torque capacity may be delayed as is shown in FIG. 4. The torque converter clutch torque capacity is reduced to allow the torque converter to slip during engine starting, thereby reducing noise, vibration, and harshness during engine starting. The torque converter clutch capacity at 412 is ramped as shown in more detail in FIG. 6.

At time T12, the engine is restarted as indicated by the engine operating state transitioning to a higher level. Since the engine is restarted, the torque converter clutch torque capacity according to the method of FIG. 7 is increased. The transmission input shaft torque 425 and the torque converter hard lock torque 402 remain at constant values. In this way, operation of an open torque converter clutch may be adjusted to reduce engine starting noise and vibration while at the same time improving driveline efficiency.

Figure 5:
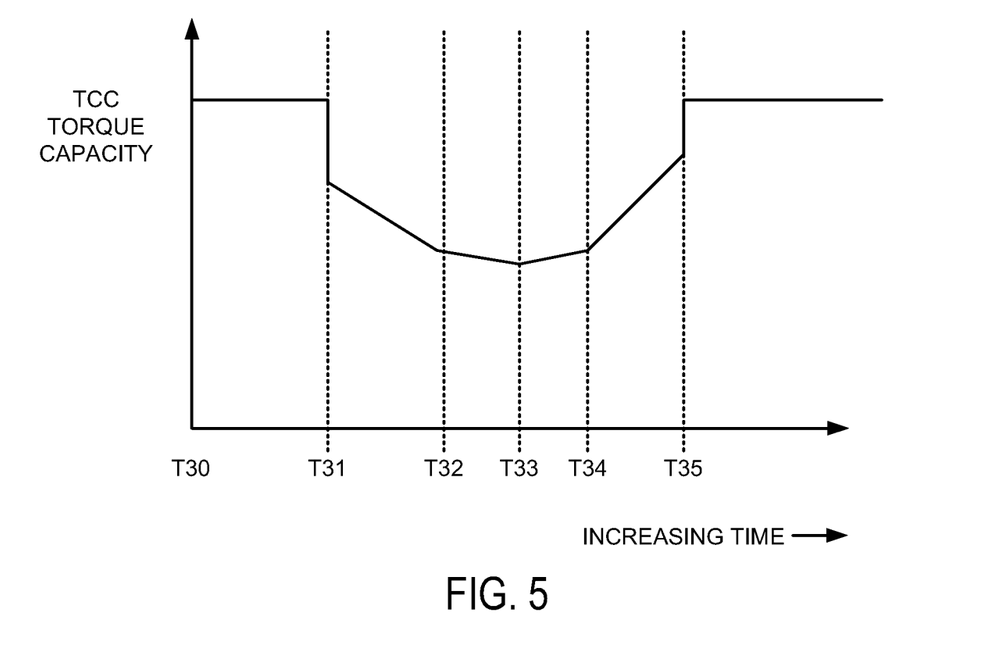

Referring now to FIG. 5, a detailed plot of torque converter clutch torque capacity versus time for reducing torque converter clutch torque during engine starting is shown. The plot of FIG. 5 provides an example of area 320 of FIG. 3. The sequence shown in the plot of FIG. 5 may be provided by the system of FIGS. 1 and 2 according to the method of FIG. 7. The X axis represents time and time increases from the left side of the plot to the right side of the plot. The Y axis represents torque converter clutch (TCC) torque capacity and TCC torque capacity increases in the direction of the Y axis arrow.

At time T30, the TCC capacity is at a higher level and constant. At time T31, there is a request to restart the engine (not shown) and the TCC capacity is reduced in response to the request. At time T31, the TCC capacity is ramped to a lower value at a first ramp rate. As TCC capacity nears a desired value, TCC capacity is ramped at a second ramp rate, the second ramp rate less than the first ramp rate. At time T33, the ramp rate increases and transitions from a negative ramp rate to a first positive ramp rate in response to engine motion, but in some examples, the ramp rate may transition positive in response to the engine starting. At time T34, the ramp rate increases to second positive ramp rate, the second positive ramp rate greater than the first positive ramp rate. The ramp rate may transition to the second ramp rate in response to an amount of time passed or an engine speed reaching a predetermined value. At time T35, the second ramp rate is ceased and TCC capacity is increased to a value based on the active torque sources supplying positive torque to the driveline.

Figure 6:
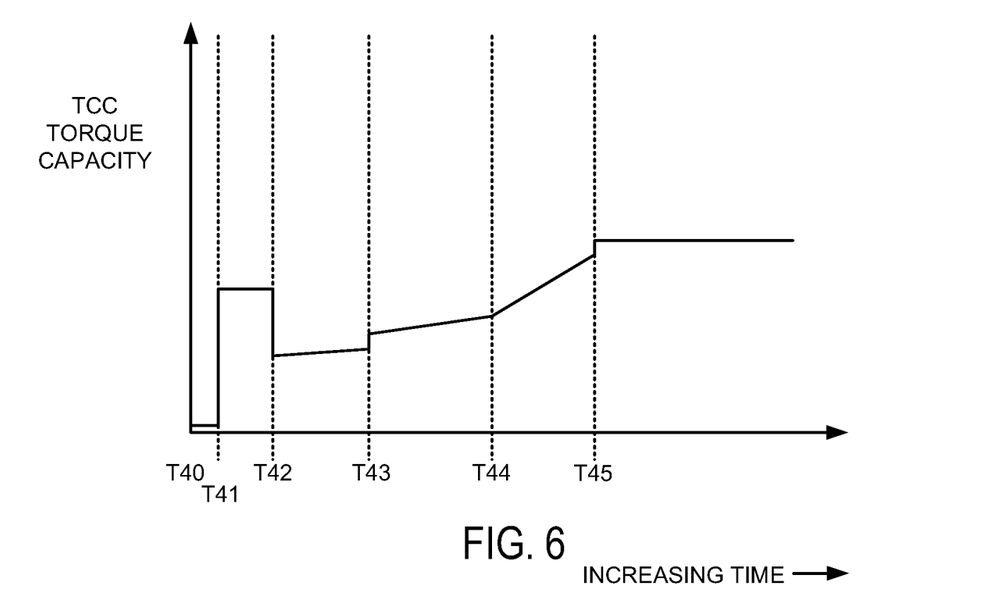

Referring now to FIG. 6, a detailed plot of torque converter clutch torque capacity versus time for increasing torque converter clutch torque during engine starting from an open TCC state is shown. The plot of FIG. 6 provides an example of area 412 of FIG. 4. The sequence shown in the plot of FIG. 6 may be provided by the system of FIGS. 1 and 2 according to the method of FIG. 7. The X axis represents time and time increases from the left side of the plot to the right side of the plot. The Y axis represents torque converter clutch (TCC) torque capacity and TCC torque capacity increases in the direction of the Y axis arrow.

At time T40, the TCC capacity is at a lower level since the TCC is in an open state. At time T41, there is a request to restart the engine (not shown) and the TCC capacity is increased in response to the request. At time T42, the TCC capacity is ramped to up at a first ramp rate. As TCC capacity increases, TCC capacity is ramped at a second ramp rate, the second ramp rate greater than the first ramp rate at time T43. At time T44, the ramp rate increases to a third rate in response to an amount of time since time T41 or in response to engine speed. At time T45, the third ramp rate is ceased and TCC capacity is increased to a value based on the active torque sources supplying positive torque to the driveline.

Referring now to FIG. 7, a method for operating a torque converter clutch of a hybrid vehicle is shown. The method of FIG. 7 may be included in the system of FIGS. 1 and 2. Further, the method of FIG. 7 may provide the operating sequences shown in FIGS. 3-6.

At 702, method 700 determines engine operating state. In one example, the engine is determined to be operating if engine speed is greater than a threshold speed and fuel is supplied to the engine. Otherwise, the engine is determined to not be operating. Method 700 proceeds to 704 after engine state is determined.

At 704, method 700 determines a desired transmission input shaft torque. In one example, the desired transmission input shaft torque may be determined based on a driver demand torque input to an accelerator pedal that is converted to a desired wheel torque. The desired wheel torque is converted to a transmission input torque after multiplying the desired wheel torque by the transmission gear ratio and subtracting transmission losses. Method 700 proceeds to 706 after transmission input shaft torque is determined.

At 706, method 700 judges whether or not the torque converter clutch is closed or open. In one example, the torque converter clutch may be determined to be closed if the torque converter clutch is at least partially closed. The torque converter clutch may be determined to be closed if a valve supplying transmission fluid to the torque converter clutch is open and allowing transmission fluid to the torque converter clutch. A bit or variable in memory may hold a value that changes state in response to the valve being active or inactive. If method 700 judges that the torque converter clutch is closed the answer is yes and method 700 proceeds to 708. Otherwise, the answer is no and method 700 proceeds to 730.

At 708, method 700 judges whether or not the engine is stopped. The engine may be determined to be stopped based on the engine operating state determined at 702. If method 700 judges that the engine is stopped, the answer is yes and method 700 proceeds to 710. Otherwise, the answer is no and method 700 proceeds to 720.

At 710, method 700 determines the torque converter clutch margin torque based on operating the driveline in electric machine only mode. In one example, the torque converter margin torque for operating the driveline in electric machine only mode is a value based on electric machine speed. Further, torque converter clutch margin torque based on operating the driveline in electric machine only mode (e.g., where only the electric machine provides positive torque to the driveline) is less than a torque converter clutch margin torque based on operating the driveline with both the electric machine and the engine being active. In one example, the torque converter clutch margin torque is empirically determined, stored in a table, and output from the table when the table is indexed using electric machine speed. Method 700 proceeds to 712 after the torque converter clutch margin torque based on operating the driveline in electric machine only mode is determined.

At 712, the torque converter clutch (TCC) torque capacity is adjusted to a value based on the transmission input shaft torque plus the torque converter margin torque for operating the driveline in electric machine only mode. In one example, the torque converter clutch torque capacity may be adjusted via adjusting a duty cycle of a valve that supplies transmission fluid to the TCC. The valve duty cycle may be adjusted by changing a duty cycle of an electrical signal supplied to the valve. Pressure of transmission fluid supplied to the torque converter clutch is adjusted as a duty cycle of the valve is adjusted, and the pressure of transmission fluid supplied to the TCC adjusts the torque capacity of the TCC. If pressure of fluid supplied to the TCC increases, the TCC torque capacity may increase until the TCC torque capacity reaches the rated limit. If pressure of fluid supplied to the TCC decreases, the TCC torque capacity may decrease until the TCC is open. Method 700 proceeds to 714 after the TCC torque capacity is adjusted At 714, method 700 judges whether or not an engine start is requested. An engine start request may be provided by a driver or a controller. The engine may be requested to restart in response to vehicle operating conditions. If method 700 judges that an engine start is requested, the answer is yes and method 700 proceeds to 716. Otherwise, the answer is no and method 700 proceeds to exit.

At 716, method 700 reduces TCC torque capacity in response to the engine start request. The TCC torque capacity is reduced to allow some slip in the driveline to reduce the possibility of noise, vibration, and harshness. The TCC torque capacity is reduced via lowing pressure of fluid supplied to the TCC as described at FIG. 5. Method 700 proceeds to 718 after the TCC torque capacity is reduced.

At 718, method 700 starts the engine. The engine is started via rotating the engine using the electric machine (e.g., DISG) and supplying fuel to the engine. Method 700 proceeds to 722 after the engine is started.

At 720, method 700 determines the torque converter clutch margin torque based on operating the driveline in dual propulsion mode (e.g., both the electric machine and the engine provide positive torque to the driveline). In one example, the torque converter margin torque for operating the driveline in dual propulsion mode is a value based on electric machine speed, which is equivalent to engine speed when the driveline disconnect clutch is closed. Further, torque converter clutch margin torque based on operating the driveline in dual propulsion mode is greater than a torque converter clutch margin torque based on operating the driveline with only the electric machine being active. In one example, the torque converter clutch margin torque is empirically determined, stored in a table, and output from the table when the table is indexed using electric machine speed.

Additionally, in some examples, the torque converter clutch margin torque may be adjusted based on a number of active torque sources in the driveline. For example, if the engine and motor are providing positive torque to the driveline, the margin torque may be 100 N-m, whereas if only the electric machine is active, the margin torque may be adjusted to 50 N-m. Further, the TCC margin torque may be adjusted responsive to the specific active torque producing devices. For example, if only the engine is active, the TCC margin torque may be 75 N-m, whereas if only the electric machine is active, the margin torque may be adjusted to 50 N-m. Method 700 proceeds to 722 after the torque converter clutch margin torque based on operating the driveline in dual propulsion mode is determined.

At 722, the torque converter clutch (TCC) torque capacity is adjusted to a value based on the transmission input shaft torque plus the torque converter margin torque for operating the driveline in dual propulsion mode. In one example, the torque converter clutch torque capacity may be adjusted via adjusting a duty cycle of a valve that supplies transmission fluid to the TCC. The valve duty cycle may be adjusted by changing a duty cycle of an electrical signal supplied to the valve. Pressure of transmission fluid supplied to the torque converter clutch is adjusted as a duty cycle of the valve is adjusted, and the pressure of transmission fluid supplied to the TCC adjusts the torque capacity of the TCC. If pressure of fluid supplied to the TCC increases, the TCC torque capacity increases until the TCC torque capacity reaches the rated limit. If pressure of fluid supplied to the TCC decreases, the TCC torque capacity may decrease until the TCC is open. Method 700 proceeds to exit after the TCC torque capacity is adjusted.

At 730, method 700 judges whether or not torque converter clutch closing is requested. The torque converter clutch may be requested closed before an engine restart, when torque converter turbine speed is within a threshold of torque converter impeller speed, or in response to other operating conditions such as vehicle speed and selected gear. If method 700 judges that torque converter clutch closing is requested, the answer is yes and method 700 proceeds to 732. Otherwise, the answer is no and method 700 proceeds to exit.

At 732, method 700 judges whether or not the engine is stopped. The engine may be determined to be stopped based on the engine operating state determined at 702. If method 700 judges that the engine is stopped, the answer is yes and method 700 proceeds to 734. Otherwise, the answer is no and method 700 proceeds to 750.

At 734, method 700 determines the torque converter clutch margin torque based on operating the driveline in electric machine only mode. In one example, the torque converter margin torque for operating the driveline in electric machine only mode is a value based on electric machine speed. Further, torque converter clutch margin torque based on operating the driveline in electric machine only mode (e.g., where only the electric machine provides positive torque to the driveline) is less than a torque converter clutch margin torque based on operating the driveline with both the electric machine and the engine being active. In one example, the torque converter clutch margin torque is empirically determined, stored in a table, and output from the table when the table is indexed using electric machine speed. Method 700 proceeds to 736 after the torque converter clutch margin torque based on operating the driveline in electric machine only mode is determined.

At 736, the torque converter clutch (TCC) is closed and TCC torque capacity is ramped to a value based on the transmission input shaft torque plus the torque converter margin torque for operating the driveline in electric machine only mode. In one example, the torque converter clutch torque capacity may be adjusted via adjusting a duty cycle of a valve that supplies transmission fluid to the TCC. The valve duty cycle may be adjusted by changing a duty cycle of an electrical signal supplied to the valve. Pressure of transmission fluid supplied to the torque converter clutch is adjusted as a duty cycle of the valve is adjusted, and the pressure of transmission fluid supplied to the TCC adjusts the torque capacity of the TCC. If pressure of fluid supplied to the TCC increases, the TCC torque capacity may increase until the TCC torque capacity reaches the rated limit. The TCC clutch capacity may be ramped using different rates as described in FIG. 6. Method 700 proceeds to 738 after the TCC torque capacity is increased.

At 738, method 700 judges whether or not an engine start is requested. An engine start request may be provided by a driver or a controller. The engine may be requested to restart in response to vehicle operating conditions. If method 700 judges that an engine start is requested, the answer is yes and method 700 proceeds to 740. Otherwise, the answer is no and method 700 proceeds to exit.

At 740, method 700 reduces TCC torque capacity in response to the engine start request. The TCC torque capacity is reduced to allow some slip in the driveline to reduce the possibility of noise, vibration, and harshness. The TCC torque capacity is reduced via lowing pressure of fluid supplied to the TCC as described at FIG. 5. Method 700 proceeds to 742 after the TCC torque capacity is reduced.

At 742, method 700 starts the engine. The engine is started via rotating the engine using the electric machine (e.g., DISG) and supplying fuel to the engine. Method 700 proceeds to 722 after the engine is started.

At 750, method 700 determines the torque converter clutch margin torque based on operating the driveline in dual propulsion mode (e.g., both the electric machine and the engine provide positive torque to the driveline). In one example, the torque converter margin torque for operating the driveline in dual propulsion mode is a value based on electric machine speed, which is equivalent to engine speed when the driveline disconnect clutch is closed. Further, torque converter clutch margin torque based on operating the driveline in dual propulsion mode is greater than a torque converter clutch margin torque based on operating the driveline with only the electric machine being active. In one example, the torque converter clutch margin torque is empirically determined, stored in a table, and output from the table when the table is indexed using electric machine speed. Method 700 proceeds to 752 after the torque converter clutch margin torque based on operating the driveline in dual propulsion mode is determined.

At 752, the torque converter clutch (TCC) is closed and the TCC torque capacity is adjusted to a value based on the transmission input shaft torque plus the torque converter margin torque for operating the driveline in dual propulsion mode. In one example, the torque converter clutch torque capacity may be adjusted via adjusting a duty cycle of a valve that supplies transmission fluid to the TCC. The valve duty cycle may be adjusted by changing a duty cycle of an electrical signal supplied to the valve. Pressure of transmission fluid supplied to the torque converter clutch is adjusted as a duty cycle of the valve is adjusted, and the pressure of transmission fluid supplied to the TCC adjusts the torque capacity of the TCC. If pressure of fluid supplied to the TCC increases, the TCC torque capacity increases until the TCC torque capacity reaches the rated limit. If pressure of fluid supplied to the TCC decreases, the TCC torque capacity may decrease until the TCC is open. Method 700 proceeds to exit after the TCC torque capacity is adjusted.

In this way, torque converter clutch operation may be adjusted to reduce engine starting time. Further, driveline losses may be reduced since less pressure from the transmission pump may be used.

Thus, the method of FIG. 7 provides for a driveline operating method, comprising: applying a first margin torque to a torque converter clutch when an engine and an electric machine are mechanically coupled; and applying a second margin torque to the torque converter clutch when the engine and electric machine are not mechanically coupled. The method includes where the second margin torque is less than the first margin torque, and where the first and second margin torques are provided to the torque converter clutch via supplying a fluid to the torque converter clutch. The method includes where the first margin torque and the second margin torque increase a torque capacity of the torque converter clutch.

In some examples, the method includes where the torque capacity of the torque converter is an amount of torque the torque converter clutch is capable of transferring at present operating conditions. The method includes where the first margin torque and the second margin torque are increased via increasing pressure of a fluid supplied to the torque converter clutch. The method includes where the engine and electric machine supply positive torque to a driveline when the engine and electric machine are coupled, and where the engine and electric machine are mechanically coupled to vehicle wheels. The method also includes where the torque margin increases a torque capacity of the torque converter clutch to a value greater than a transmission input torque.

The method of FIG. 7 also provides for a driveline operating method, comprising: applying a margin torque to a torque converter clutch, where the margin torque varies depending on a number of active torque devices supplying positive torque to a driveline, and where the margin torque is varied via adjusting pressure of a fluid supplied to the torque converter clutch. The method includes where the margin torque is a first torque when torque is supplied to the driveline only via an electric machine. The method includes where the margin torque is a second torque when torque is supplied to the driveline via the electric machine and an engine.

In some examples, the method further comprises reducing the margin torque in response to a request to start an engine. The method includes where the reducing the margin torque increases torque converter clutch slip. The method includes where torque converter torque capacity is ramped to the margin torque when the torque converter clutch is applied. The method further comprises applying a plurality of torque converter torque capacity ramp rates in response to a request to start an engine.

As will be appreciated by one of ordinary skill in the art, method described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
   adjusting an operating state of an engine from an on state to an off state; and
   increasing a torque capacity of a torque converter clutch to a first torque capacity in response to adjusting the operating state of the engine from the on state to the off state and before a request to start the engine after adjusting the engine operating state to the off state, where the first torque capacity of the torque converter clutch is a value based on supplying torque to a driveline via only one torque source, the only one torque source being an electric machine, and where the first torque capacity is a sum of a transmission input torque and a torque that is based on a speed of the electric machine.

2. The method of claim 1, where increasing the torque capacity of the torque converter clutch includes increasing the torque converter clutch capacity from zero.

3. The method of claim 2, where the torque that is based on the speed of the electric machine is determined via indexing a table via the speed of the electric machine.

4. The method of claim 1, further comprising reducing the first torque capacity in response to the request to start the engine.

5. The method of claim 4, where the reducing the first torque capacity increases torque converter clutch slip.

6. The method of claim 1, where the torque capacity of the torque converter clutch is ramped to the first torque capacity when the torque converter clutch is applied.

7. A driveline operating method, comprising:
- adjusting an operating state of an engine from an on state to an off state;
- during a first condition, reducing a torque capacity of a torque converter clutch to a first torque capacity in response to adjusting the engine operating state from the on state to the off state and before a request to start the engine after adjusting the engine operating state to the off state, and reducing the torque capacity of the torque converter clutch to a second capacity in response to the request to start the engine;
- during a second condition, increasing the torque capacity of the torque converter clutch; and
- increasing a ramping rate of the torque capacity in response to a speed of the engine after the engine start request and during engine starting.

8. The method of claim 7, further comprising increasing the ramping rate two times during the engine starting.

9. The method of claim 4, where the first torque capacity is reduced while the engine is stopped.

10. The method of claim 1, where increasing the torque capacity of the torque converter clutch to the first torque capacity is performed during a first condition, and further comprising:
- during a second condition, reducing the torque capacity of the torque converter clutch to a second torque capacity in response to adjusting the engine operating state from the on state to the off state and before the request to start the engine after adjusting the engine operating state to the off state, and reducing the torque capacity of the torque converter clutch to a third torque capacity in response to the request to start the engine.

* * * * *